(12) United States Patent
Margetts

(10) Patent No.: US 10,331,584 B2
(45) Date of Patent: Jun. 25, 2019

(54) INTERNAL SYSTEM NAMESPACE EXPOSED THROUGH USE OF TWO LOCAL PROCESSORS AND CONTROLLER MEMORY BUFFER WITH TWO RESERVED AREAS

(71) Applicant: Toshiba Memory Corporation, Minato-Ku, Tokyo (JP)

(72) Inventor: Julien Margetts, Thame (GB)

(73) Assignee: Toshiba Memory Corporation, Tokyo (JP)

(*) Notice: Subject to any disclaimer, the term of this patent is extended or adjusted under 35 U.S.C. 154(b) by 26 days.

(21) Appl. No.: 15/454,974

(22) Filed: Mar. 9, 2017

(65) Prior Publication Data
US 2018/0260145 A1 Sep. 13, 2018

(51) Int. Cl.
*G06F 3/06* (2006.01)
*G06F 12/02* (2006.01)
*G06F 13/16* (2006.01)

(52) U.S. Cl.
CPC ........ *G06F 13/1668* (2013.01); *G06F 3/0604* (2013.01); *G06F 3/0616* (2013.01); *G06F 3/0658* (2013.01); *G06F 3/0659* (2013.01); *G06F 3/0679* (2013.01); *G06F 12/0246* (2013.01); *G06F 2212/1056* (2013.01); *G06F 2212/7205* (2013.01)

(58) Field of Classification Search
CPC .............. G06F 3/06–0689; G06F 13/16–1694
See application file for complete search history.

(56) References Cited

U.S. PATENT DOCUMENTS 6,311,257 B1 * 10/2001 Fitzgerald ............. G06F 3/0608
710/1
8,381,023 B2 2/2013 Tanaka
8,521,972 B1 * 8/2013 Boyle ................. G06F 12/0246
711/103
(Continued)

FOREIGN PATENT DOCUMENTS

KR 10-2018-0062246 * 6/2018 ............. G06F 11/20
WO 2009/100149 8/2009

OTHER PUBLICATIONS

English translation of KR 10-2018-0062246.*
UNH-IOL, "NVME Test Consortium Test Plan for NVMe Conformance" Version 1.2.1 Technical Document, 96 pages, (Nov. 2015).

*Primary Examiner* — Nathan Sadler
(74) *Attorney, Agent, or Firm* — White & Case LLP

(57) ABSTRACT

A solid state drive (SSD) and a method for managing data stored in the SSD is disclosed. In one embodiment, the SSD includes a memory controller and a controller memory buffer within the memory controller. The SSD further includes a host interface communicatively coupled to the memory controller and configured to receive a set of host commands from a host device. A first local processor of the SSD is configured to generate a set of local commands, and a second local processor of the SSD is configured to execute the set of local commands and the set of host commands. The memory controller is configured to store the set of local commands in a first area of the controller memory buffer reserved for the first local processor and to store the set of host commands in a second area of the controller memory buffer reserved for the host device.

24 Claims, 6 Drawing Sheets

(56) References Cited

U.S. PATENT DOCUMENTS

| | | | | |
|---|---|---|---|---|
| 8,725,931 B1* | 5/2014 | Kang | ................ | G06F 12/0246 |
| | | | | 710/52 |
| 8,782,327 B1* | 7/2014 | Kang | ................ | G06F 12/0246 |
| | | | | 711/103 |
| 9,348,705 B1 | 5/2016 | Wu et al. | | |
| 9,430,412 B2 | 8/2016 | Huang | | |
| 9,959,209 B1* | 5/2018 | Burton | ................ | G06F 12/0866 |
| 2003/0056038 A1* | 3/2003 | Cochran | ................ | G06F 3/0601 |
| | | | | 710/36 |
| 2003/0221070 A1* | 11/2003 | Minowa | ................ | G06F 3/0619 |
| | | | | 711/147 |
| 2008/0282264 A1* | 11/2008 | Chen | ................ | G06F 3/0604 |
| | | | | 719/320 |
| 2016/0124842 A1 | 5/2016 | Kanno | | |
| 2016/0210052 A1 | 7/2016 | Kanno et al. | | |
| 2016/0291866 A1 | 10/2016 | Olcay et al. | | |
| 2016/0306549 A1* | 10/2016 | Nadakuditi | ............. | G06F 3/061 |
| 2017/0024137 A1 | 1/2017 | Kanno | | |
| 2017/0109058 A1* | 4/2017 | Shallal | ................ | G06F 3/0611 |
| 2017/0300263 A1* | 10/2017 | Helmick | ................ | G06F 3/0625 |
| 2018/0088810 A1* | 3/2018 | Ramalingam | ......... | G06F 3/0604 |
| 2018/0150401 A1* | 5/2018 | Chang | ................ | G06F 12/0891 |

\* cited by examiner

INTERNAL SYSTEM NAMESPACE EXPOSED THROUGH USE OF TWO LOCAL PROCESSORS AND CONTROLLER MEMORY BUFFER WITH TWO RESERVED AREAS

FIELD OF THE INVENTION

This invention generally relates to managing data stored in memory devices of a solid state drive (SSD).

BACKGROUND OF THE INVENTION

SSDs are mass storage devices that are used in communication with a host device, such as a personal computer or a mass storage appliance to provide data storage for the host device. There are a number of different interface specifications for the host device to interact with the SSD. The type of interface specification used will usually depend on the specific interface used to connect the host device and the SSD. For example, where the interface is an interface that complies with the Peripheral Component Interconnect Express (PCIe) industry standard, then one such interface specification may be Non-Volatile Memory Express (NVMe). NVMe provides a streamlined protocol and standardized command sets definitions for the host device to interface with the SSD.

In operation, the SSD's memory controller internally generates system data used to manage the operation of volatile and persistent memory devices used by the SSD for storage. The SSD's system data may be, for example, metadata for host data written to the memory devices, logical-to-physical (L2P) look-up-tables (LUTs), the read/write count of logical block addresses (LBAs), timestamps of LBA updates, etc. Such system data needs to be maintained within the persistent memory devices (e.g. non-volatile flash memory devices) of the SSD so that data stored within the SSD can be recovered after a shutdown or system failure. The memory controller, therefore, needs to also be able to manage internal system data. However, in typical SSDs, the memory controller manages internal system data in a different manner than data received from the host device. The memory controller is usually configured to use a proprietary protocol to manage the internal system data, while using a standard interface specification, such as NVMe, to manage host data. This arrangement of two parallel set of protocols, one for host data and the other for local system data, increases the complexity of the SSD's memory controller firmware.

Moreover, due to the use of separate protocols, locally generated system data and host data are stored in separate areas within the SSD's persistent memory. Given this, the area reserved for local system data cannot be used to store host data, and vice versa. This arrangement may reduce the storage capacity of the SSD as the host data cannot be written in the area reserved for local system data even when such area is effectively empty. Further, given that the local system data and host data are separately stored in a SSD memory device, namespaces for host data and local system data must also be separately maintained and managed. Correspondingly, other memory management operations, such as garbage collection, wear leveling, bad block management, and power loss protection, must also be separately conducted for local system data and host data, further increasing the complexity of the SSD's firmware.

Accordingly, there is an unmet demand for an SSD having uniform management of both host data and local system data and reduced firmware complexity.

BRIEF DESCRIPTION OF THE INVENTION

In one embodiment, an SSD includes a memory controller and a controller memory buffer within the memory controller. A host interface of the SSD is communicatively coupled to the memory controller and configured to receive a set of host commands from a host device. The SSD further includes a first local processor configured to generate a set of local commands, and a second local processor configured to execute the set of local commands and the set of host commands. The memory controller is configured to store the set of local commands in a first area of the memory controller buffer reserved for the first local processor, and to store the set of host commands in a second area of the memory controller buffer reserved for the host device.

In one embodiment, the local system data includes metadata of host data written to one or more non-volatile memory devices communicatively coupled to the memory controller, logical-to-physical look up tables, read or write counts of logical block addresses, or timestamps of logical block address updates. In one embodiment, the first local processor is a flash translation (FTL) processor. In another embodiment, the first local processor is a flash interface layer (FIL) processor. In one embodiment, the second local processor is a command layer processor.

In one embodiment, the memory controller is further configured to store local system data generated by the first local processor in the first area of the controller memory buffer. In one embodiment, the host interface is further configured to receive host data from the host device, and the memory controller is further configured to store the host data in the second area of the controller memory buffer. In one embodiment, the second local processor is further configured to store a completion message in the first area of the controller memory buffer after one of the set of local commands has been executed.

In one embodiment, where the set of local commands includes a write command, the second local processor is further configured to write local system data stored in the first area of the controller memory buffer to one or more non-volatile memory devices communicatively coupled to the memory controller. In another embodiment, where the set of local commands includes a read command, the second local processor is further configured to write local system data stored in one or more non-volatile memory devices communicatively coupled to the memory controller to the first area of the controller memory buffer.

In one embodiment, where the set of host commands includes a write command, the second local processor is further configured to write host data stored in the second area of the controller memory buffer to one or more non-volatile memory devices communicatively coupled to the memory controller. In another embodiment, where the set of host commands includes a read command, the second local processor is further configured to retrieve host data stored in one or more non-volatile memory devices communicatively coupled to the memory controller.

In one embodiment, a method of managing data stored in an SSD includes reserving a first area and a second area of a controller memory buffer within a memory controller. The method further includes generating, by a first local processor, a set of local commands, and receiving, by a host interface communicatively coupled to the memory controller, a set of host commands from a host device. The method further includes storing the set of local commands in the first area of the controller memory buffer and the set of host commands in the second area of the controller memory buffer. In one embodiment, the method further includes executing, by a second local processor, the set of local commands and the set of host commands.

In one embodiment, the local system data includes metadata of host data written to one or more non-volatile memory devices communicatively coupled to the memory controller, logical-to-physical look up tables, read or write counts of logical block addresses, or timestamps of logical block address updates. In one embodiment, the first local processor is an FTL processor. In another embodiment, the first local processor is an FIL processor. In one embodiment, the second local processor is a command layer processor.

In one embodiment, the method further includes generating, by the first local processor, local system data, and storing the local system data in the first area of the controller memory buffer. In one embodiment, the method further includes receiving, by the host interface, host data from the host device and storing the host data in the second area of the controller memory buffer. In one embodiment, the method further includes storing, by the second local processor, a completion message in the first area of the controller memory buffer after one of the set of local commands has been executed.

In one embodiment, the method further includes writing, by the second local processor, local system data in the first area of the controller memory buffer to one or more non-volatile memory devices communicatively coupled to the memory controller when the set of local commands includes a write command. In another embodiment, the method further includes writing, by the second local processor, local system data in one or more non-volatile memory devices communicatively coupled to the memory controller to the first area of the controller memory buffer when the set of local commands includes a read command.

In one embodiment, the method further includes writing, by the second local processor, host data in the second area of the controller memory buffer to one or more non-volatile memory devices communicatively coupled to the memory controller when the set of host commands includes a write command. In another embodiment, the method further includes retrieving, by the second local processor, host data in one or more non-volatile memory devices communicatively coupled to the memory controller when the set of host commands includes a read command.

DETAILED DESCRIPTION OF THE INVENTION

Figure 1:
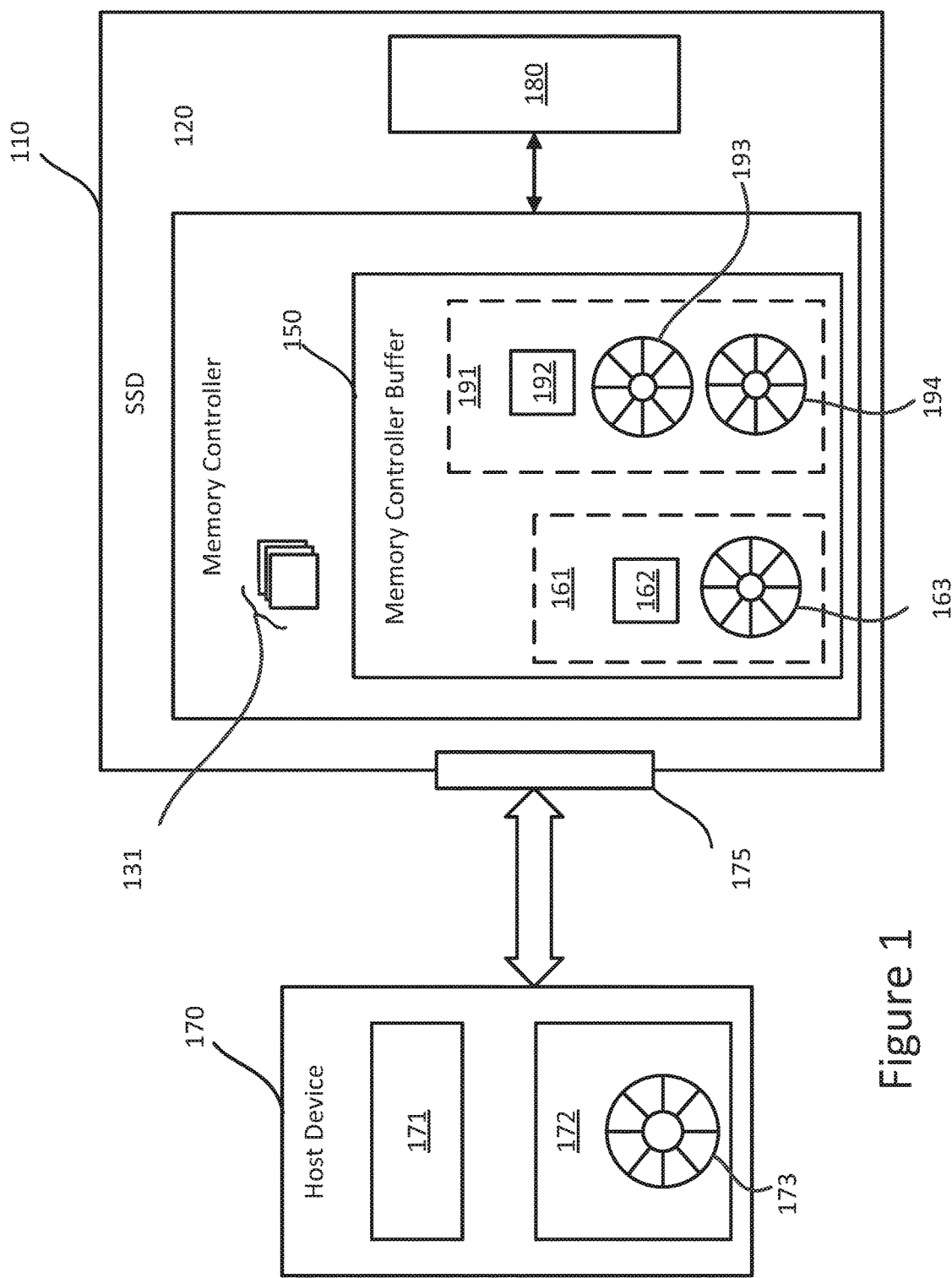
FIG. 1 is a block diagram of an SSD connected to a host device, according to one embodiment of the invention.

FIG. 1 is a block diagram of an SSD 110 connected to a host device 170, according to one embodiment of the invention. The SSD 110 includes a host interface 175, a memory controller 120, and one or more non-volatile memory devices 180 capable of storing data. The host interface 175 and the one or more non-volatile memory devices 180 are communicatively coupled to the memory controller 120. In one embodiment, the one or more memory devices 180 are flash-based memory devices. In one embodiment, the one or more memory devices 180 are NAND flash memory devices. The memory controller 120 is configured to manage the operation of the one or more non-volatile memory devices 180, including writing data to and reading data from the one or more non-volatile memory devices 180, performing garbage collection, wear leveling, bad block management, etc. The host interface 175 may be any suitable interface that facilitates communication between the SSD 110 and the host device 170, such as a PCIe interface.

The memory controller 120 includes one or more local processors 131 that generate local system data during operation of the SSD 110. For example, one of the one or more local processors 131 may be an FTL processor that is configured to carry out FTL operations, such as L2P mapping, wear leveling and power cycle recovery. Another one of the one or more local processors 131 may be an FIL processor, which coordinates access to the one or more non-volatile memory devices 180. Examples of local system data generated by a FIL processor include metadata for data received from the host device 170, L2P LUTs, LBA read/write counts, timestamps of LBA updates, etc.

Yet another one of the one or more local processors 131 may be a command layer processor, which is a configured to processes commands received from the host device 170, providing responses to the host device 170, and managing the flow of data between the host device 170 and other local processors 131. The command layer processor is configured to execute commands in accordance with the specified interface standard. For example, where the host interface 175 is a PCIe interface, the command layer processor may be configured to execute commands in accordance with the NVMe interface standard. However, the commands that the command layer processor may be configured to execute are not limited to NVMe commands, and may include any suitable command.

The memory controller 120 further includes a controller memory buffer 150. A first area of the controller memory buffer 150 is reserved as a host command submission queue 163 for queueing commands received from the host device 170. The host command submission queue 163 is a circular buffer with a fixed slot size to queue host commands from the host device 170 for execution by the memory controller 120. A second area of the controller memory buffer 150 is reserved as a host data region 162 for storing data received from the host device 170. The pair of first and second areas together constitutes a portion 161 of the controller memory buffer 150 reserved for the host device 170. The operation the host command submission queue 163 and the host data region 162 is discussed in greater detail in connection with FIG. 4, below.

A third area of the controller memory buffer 150 is reserved as a local command submission queue 193 for queuing commands from one of the local processors 131. A fourth area of the controller memory buffer 150 is reserved as a local command completion queue 194 for queuing completion messages of executed commands by one of the local processors 131. Similar to a submission queue, a completion queue may be a circular buffer with a fixed slot size used to queue completed command messages. A fifth area of the controller memory buffer 150 is reserved as a local system data region 192 for storing local system data generated by one of the local processors 131. The local system data region 192, the local command submission queue 193, and the local command completion queue 194 together constitutes a portion 191 of the controller memory buffer 150 reserved for one of the local processors 131. The operation of the local system data region 192, the local command submission queue 193, and the local command completion queue 194 is discussed in greater detail in connection with FIG. 3, below.

The host device 170 includes a host processor 171 and a host memory buffer 172. An area of the host memory buffer 172 is reserved as a host command completion queue 173 for storing completion messages of executed host commands by the SSD 110. The host device 170 can be any suitable device that can be communicatively coupled to the SSD 110, such as a personal computer, a storage appliance, or the like. The operation of the host command completion queue 173 is discussed in greater detail in connection with FIG. 4, below.

Figure 2:
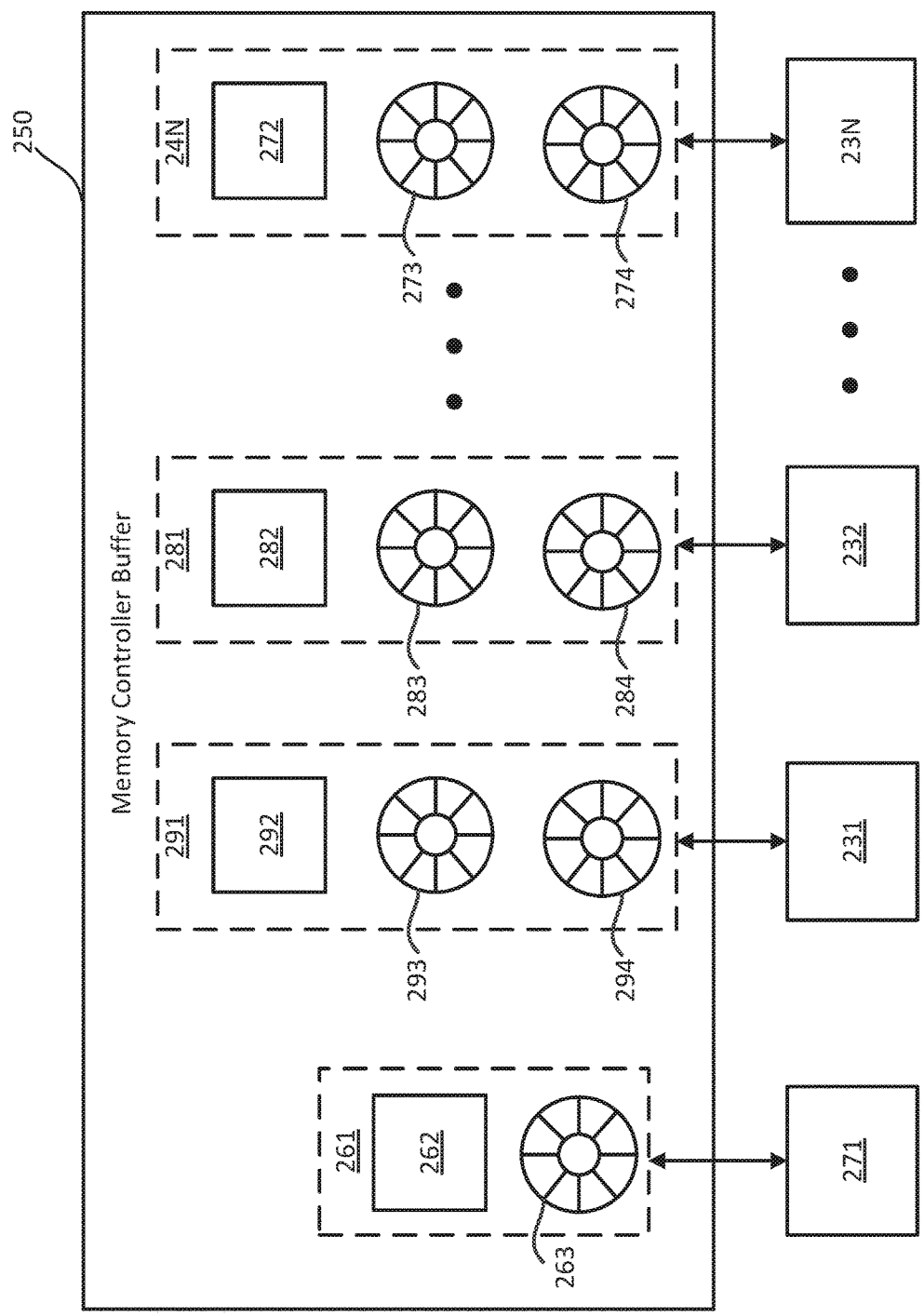
FIG. 2 is a block diagram of a controller memory buffer, according to one embodiment of the invention.

FIG. 2 is a block diagram of a controller memory buffer 250, according to one embodiment of the invention. As previously shown in FIG. 1, in one embodiment, a controller memory buffer 150 may have a single local system data region 192, local command submission queue 193 and local command completion queue 194 reserved for one of the local processors 131. In another embodiment, as shown in FIG. 2, the controller memory buffer 250 may include a plurality of reserved portions 281, 291, to 24N, for one or more local processors 232, 231, to 23N, respectively. Each reserved portion 281, 291, 24N has its own local command submission queues 283, 293, and 273, local command completion queues 284, 294, and 274, and local system data regions 282, 292, and 272, respectively. Additionally, as with the embodiment shown in FIG. 1, areas of the controller memory buffer 250 may be reserved as a host data region 262, and as a host command submission queue 263. Again, the host data region 262 and host command submission queue 263 together constitutes a portion 261 of the controller memory buffer 250 reserved for a host device 271.

Figure 3:
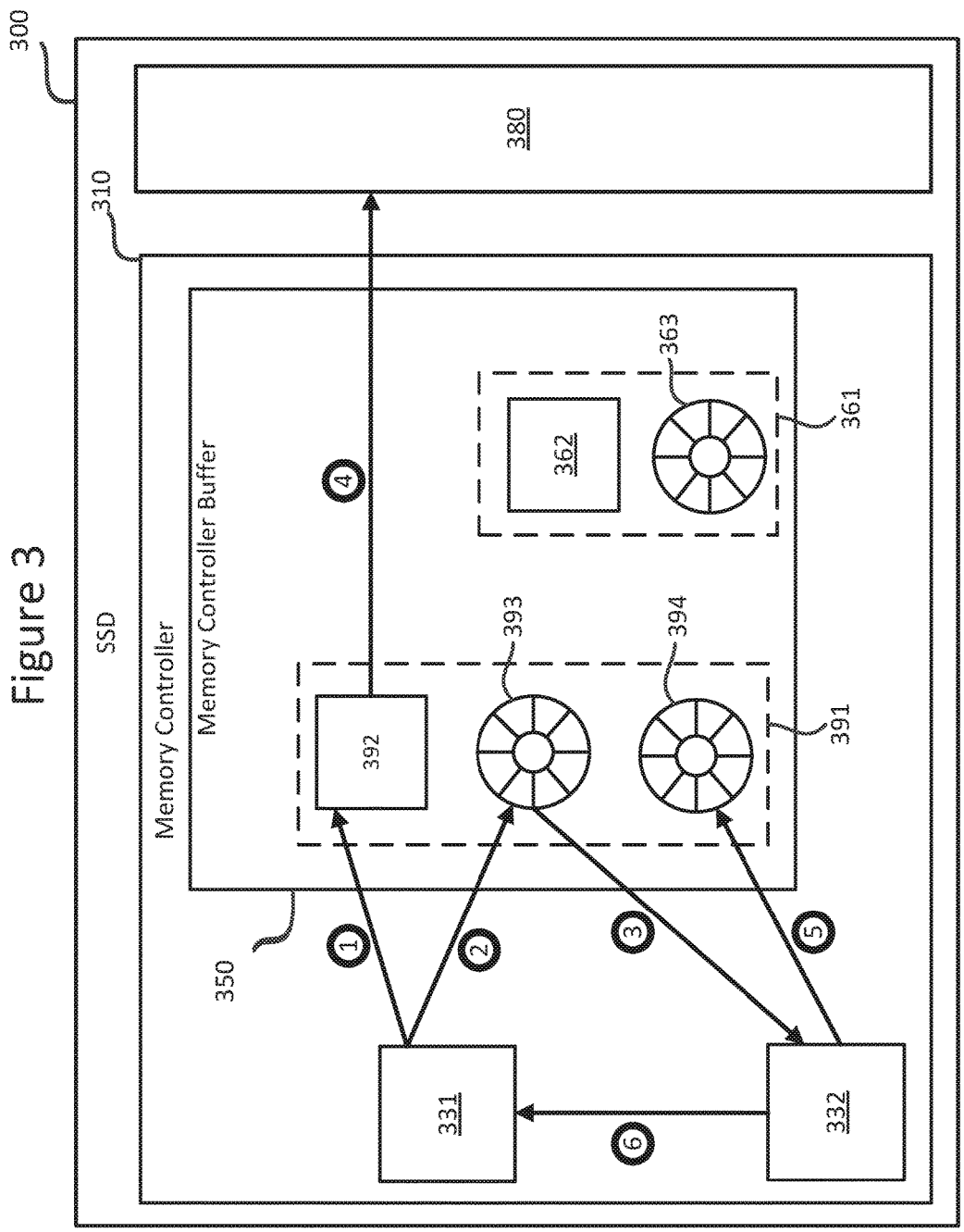
FIG. 3 is a block diagram of a memory controller managing local system data stored in one or more memory devices of an SSD, according to one embodiment of the invention.

FIG. 3 is a block diagram of a memory controller 310 managing local system data stored in one or more non-volatile memory devices 380 of an SSD 300, according to one embodiment of the invention. As previously discussed in connection with FIG. 1, the memory controller 310 of SSD 300 includes one or more local processors 331 and 322. In one embodiment, the local processor 331 may be a FTL processor or a FIL processor, or the like. The local processor 332 is a command layer processor configured to execute commands. The memory controller 310 further includes a controller memory buffer 350.

A first area of the controller memory buffer 350 is reserved as a local command submission queue 393 for queuing the commands received from the local processor 331. A second area of the controller memory buffer 350 is reserved as a local command completion queue 394 for queuing completion message for commands executed by the command layer processor 332. A third area of the controller memory buffer 350 is reserved as a local system data region 392 for storing local system data generated by the local processor 331.

The local system data region 392, the local command submission queue 393, and the local command completion queue 394 together constitutes a portion 391 of the controller memory buffer 350 reserved for local processors 331 and 332. While two local processors 331 and 332 and one portion 391 of the controller memory buffer 350 reserved for local processors 331 and 332 are shown in FIG. 3 for the sake of brevity, as previously shown and described in connection with FIG. 2, the memory controller 310 may have one or more local processors and a plurality of portions of the controller memory buffer 350 reserved for the one or more local processors within the scope of the present invention.

Further, as previously discussed in connection with FIGS. 1 and 2, a fourth area of the controller memory buffer 350 is reserved as a host command submission queue 363 for storing commands received from a host device (not shown), and a fifth area is reserved as a host data region 362 for storing data received from the host device. The host data region 362 and the host command submission queue 362 together constitutes a portion 361 of the controller memory buffer 350 reserved for the host device. While a single portion 361 of the controller memory buffer 350 is shown for a single host device is shown in FIG. 3 for the sake of brevity, a single host device may have a plurality of portions 361 of the memory controller buffer 350 reserved, each of the plurality of portions 361 including a host data region 362 and host command submission queue 363. Moreover, where there are a plurality of host devices, each host device may have one or more portions 361, with respective host data region 362 and host command submission queue 363, reserved in the controller memory buffer 350. That is, a plurality of portions of the controller memory buffer may be reserved for a plurality of host devices within the scope of the present invention.

In operation, the local processor 331 generates local system data that needs to be persistently stored in the one or more non-volatile memory devices 380. The local processor 331 first writes the local system data into the local system data region 392 of the controller memory buffer 350, as shown by the arrow (1). Subsequently, the local processor 331 queues a one or more commands into the local command submission queue 393 for the command layer processor 332, as shown by the arrow (2). The local processor 331 may also notify the command layer processor 332 that one or more of commands for execution have been queued into the submission queue 393. This can be done by the local processor 331 by writing the tail of the command queue into a doorbell register of the memory controller 310 to notify the command layer processor 332.

The command layer processor 332 then retrieves one or more commands from the local command submission queue 393 for execution, as shown by the arrow (3). In one embodiment, the one or more commands retrieved by the command layer processor includes a command to write the local system data in the local system data region 392 of the memory buffer 350 to the one or more non-volatile memory devices 380. The one or more commands may further include a pointer to a location within the local system data region 392 where the local system data to be written to the one or more memory devices 380 is stored. The command layer processor 332 executes the one or more commands and writes the local system data into the one or more non-volatile memory devices 380, as shown by the arrow (4).

After the command layer processor 332 executes the one or more commands, it queues a completion message into the local command completion queue 394, as shown by the arrow (5). The command layer processor 332 may further generate an interrupt message, and transmit the interrupt message to the local processor 331 to alert the local processor 331 of the completion of the command, as shown by the arrow (6). To generate the interrupt message, a local interrupt vector may be provided (i.e. reserved) for the command layer processor 332 to communicate the completion of the command internally within the memory controller 350 (as opposed to using Message Signaled Interrupts (MSI), MSI-X, or any legacy interrupt messages for completed host commands as will be explained in greater detail in connection with FIG. 4, below).

While FIG. 3 uses arrows (1) to (6) to show the local processors 331 and 332 of the memory controller 310 writing local system data to the one or more non-volatile memory devices 380 as one example of the memory controller 310 managing local system data stored in one or more memory devices 380 for the sake of brevity, the local processors 331 and 332 of the memory controller 310 may perform any other suitable operation for the management of local system data.

For example, in one embodiment, the local processor 331 may queue a read command to the local command submission queue 393 to read local system data stored in the one or more non-volatile memory devices 380. The command layer processor 332 retrieves the read command from the local command submission queue 393 and executes the read command. The command layer processor 332 retrieves the local system data from the one or more non-volatile memory devices 380 and places the data into the local system data region 392. The command layer processor 332 queues a completion message to the local command completion queue 394, and notifies the local processor 331 that the read command has been executed.

Figure 4:
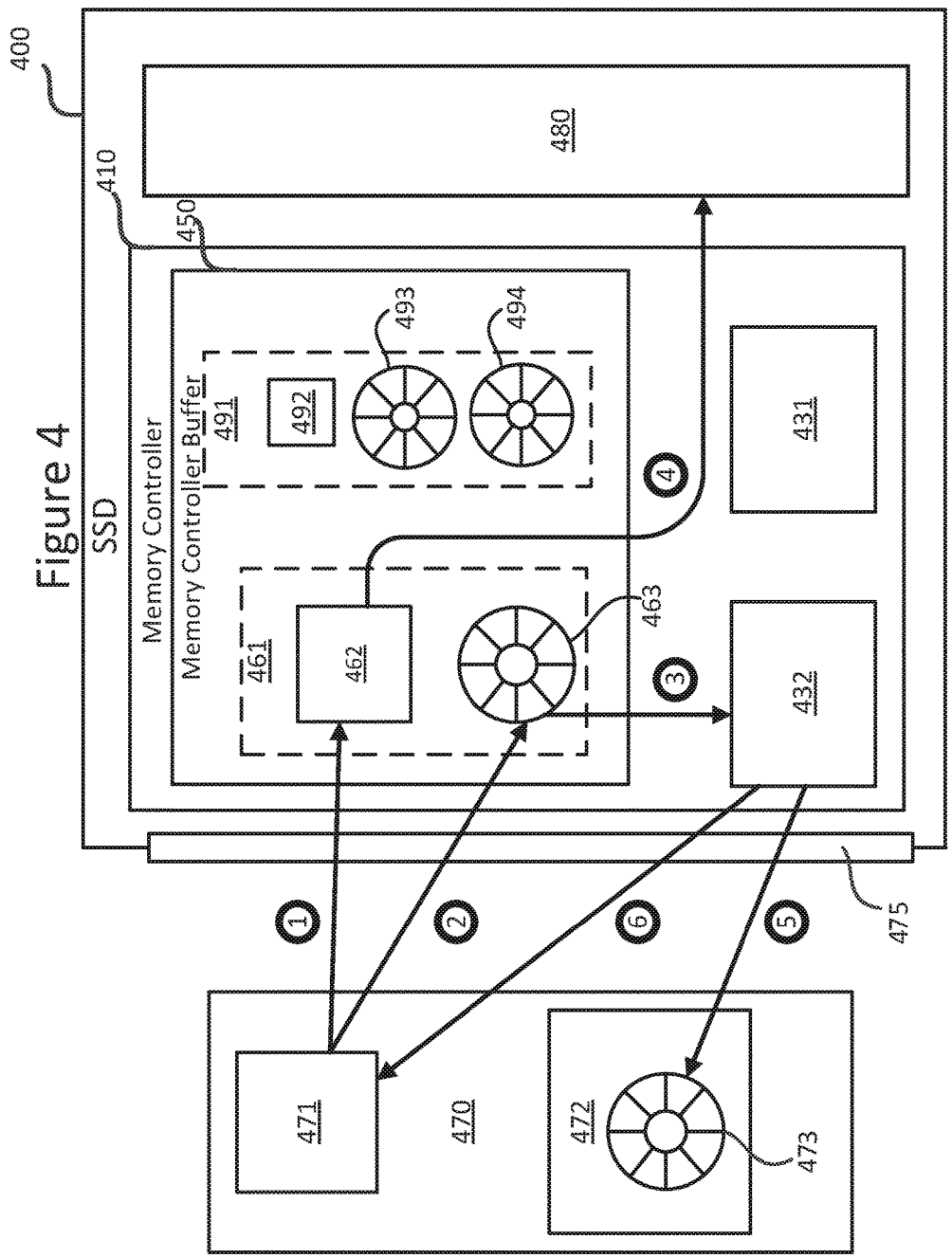
FIG. 4 is a block diagram of a memory controller managing host data stored in one or more memory devices of an SSD, according to one embodiment of the invention.

FIG. 4 is a block diagram of a memory controller 410 managing host data stored in one or more non-volatile memory devices 480 of an SSD 400, according to one embodiment of the invention. The host device 470 includes a host processor 471 and a host memory buffer 472. An area of the host memory buffer 472 is reserved as a host command completion queue 473 for queuing completion messages for executed commands by the memory controller 410. As previously discussed, the host device 470 may be any suitable device, such as a personal computer or a storage appliance. The host device 470 may be coupled to the SSD 400 via a communications interface 475. The communications interface 475 may be any suitable interface, such as a PCIe interface. Where the communications interface 475 is a PCIe interface, the NVMe interface standard may be used.

The SSD 400 includes a memory controller 410. The memory controller 410 includes a local processor 431, a command layer processor 432, and a controller memory buffer 450. A first area of the controller memory buffer 450 is reserved as a local command submission queue 493. A second area of the controller memory buffer 450 is reserved as a local command completion queue 494. A third area of the controller memory buffer 450 may be reserved as a local system data region 492 for storing local system data generated by the local processor 431. The local command submission queue 493, the local command completion queue 494, and the local system data region 492 together constitute a portion 491 reserved for the local processors 431 and 432 of the memory controller 410. Again, while two local processors 431 and 432 and one portion 491 of the controller memory buffer 450 reserved for local processors 431 and 432 are shown in FIG. 4 for the sake of brevity, as previously shown and described in connection with FIG. 2, the memory controller 410 may have one or more local processors and a plurality of portions of the controller memory buffer 450 reserved for the one or more local processors within the scope of the present invention.

A fourth area of the controller memory buffer 450 is reserved as a host command submission queue 463 for storing commands received from the host device 470, and a fifth area is reserved as a host data region 462 for storing data received from the host device 470. The host data region 462 and the host command submission queue 463 together constitutes the portion 461 of the controller memory buffer 450 reserved to facilitate the host to access the SSD's memory devices. Again, while a single portion 461 of the memory controller buffer 450 is shown for a single host device 470 in FIG. 4 for the sake of brevity, a single host device 470 may have a plurality of portions 461 of the controller memory buffer 450 reserved, each of the plurality of portions 461 including a host data region 462 and host command submission queue 463. Moreover, where there are a plurality of host devices, each host device may have one or more portions 461, with respective host data region 462 and host command submission queue 463, reserved in the controller memory buffer 450.

In operation, for a write command, the host processor 471 of the host device 470 first writes a host data into the host data region 462 of the controller memory buffer 450, as shown by the arrow (1). Subsequently, the host processor 471 queues one or more commands, including command to write the host data in the host data region 462 to the one or more non-volatile memory devices 480, into the host command submission queue 463, as shown by the arrow (2). The command may include a pointer to a location within the host data region 462 where the host data to be written to the one or more memory devices 480 is stored. The host processor 471 may also notify the command layer processor 432 that the subject set of commands is written into the submission queue 463 by writing the tail of the command queue into a doorbell register of the memory controller 410.

The command layer processor 432 then retrieves the command from the host command submission queue 463, as shown by arrow (3), and executes the command. The command layer processor 432 writes the host data from the host data region 462 to the one or more non-volatile memory devices 480, as shown by the arrow (4).

After the command layer processor 432 finishes executing the command, it queues a completion message into the host command completion queue 473 in the host memory buffer 472, as shown by the arrow (5). The command layer processor 432 may also generate an interrupt message, and transmit the interrupt message to the host processor 471 to alert the host processor 471 of the completion of the execution of the command, as shown by the arrow (6). The interrupt message may be, for example, MSI, MSI-X, or any legacy interrupt messages.

As with FIG. 3, while FIG. 4 uses arrows (1) to (6) to show the host device 470 writing data to the one or more memory devices 480 as one example of the memory controller 410 managing host data stored in one or more non-volatile memory devices 480 for the sake of brevity, the memory controller 410 may perform any other suitable operation for the management of host data.

For example, in one embodiment, the host processor 471 may queue a read command to the host command submission queue 463 to read host data stored in the one or more non-volatile memory devices 480. The command layer processor 432 retrieves the read command from the host command submission queue 463 and executes the read command. The command layer processor 432 retrieves the host data from the one or more non-volatile memory devices 480 and the memory controller returns the host data to the host device 470. The command layer processor 432 queues a completion message to the host command completion queue 473, and notifies the host processor 471 that the read command has been executed.

Figure 5:
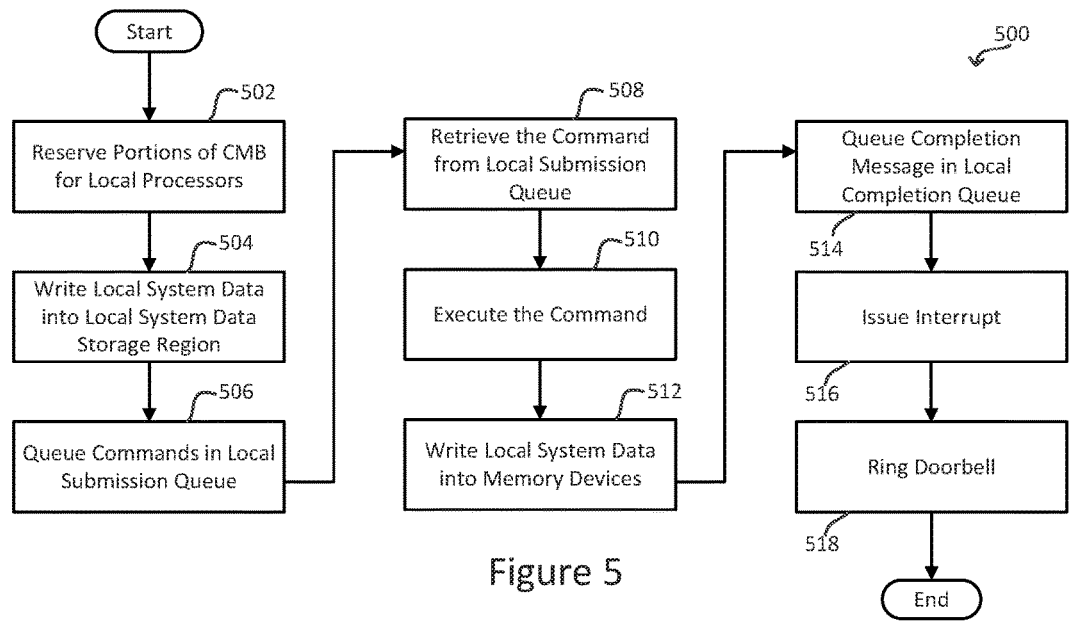
FIG. 5 shows a flowchart of steps for writing local system data to one or more memory devices of an SSD, according to one embodiment of the present invention.

FIG. 5 shows a flowchart of steps 500 for writing local system data to one or more non-volatile memory devices of an SSD, according to one embodiment of the present invention. At step 502, portions of a controller memory buffer are reserved for one or more local processors of the SSD's memory controller. As previously discussed in connection with FIGS. 1-4, areas of the controller memory buffer may be reserved as local command submission queues, local command completions queues, and local system data regions. Two separate areas of the controller memory buffer may further be reserved as a host submission queue and a host data region for a host device connected to the SSD.

At step 504, a local processor writes local system data into its respective local system data region reserved in the controller memory buffer. At step 506, local processor queues a write command into its respective local command submission queue in the controller memory buffer. The local processor may notify a command layer processor of the memory controller of the queued write command by writing the tail of the submission queue into a doorbell register of the memory controller. The write command may include a pointer to a location within the local processor's respective local system data region where the local system data to be written to the SSD's one or more non-volatile memory devices is located.

At step 508, the command layer processor retrieves the write command queued in the local command submission queue. At step 510, the command layer processor executes the retrieved command. At step 512, the command layer processor writes the local system data in the local processor's respective local system data region of the controller memory buffer into the one or more non-volatile memory devices. At step 514, the command layer processor queues a completion message into the respective local completion queue of the local processor that submitted the write command. At step 516, the command layer processor issues an interrupt to the local processor. At step 518, the local processor writes the doorbell register (i.e. "rings the doorbell") of the memory controller to acknowledge the receipt of the completion of the command.

Figure 6:
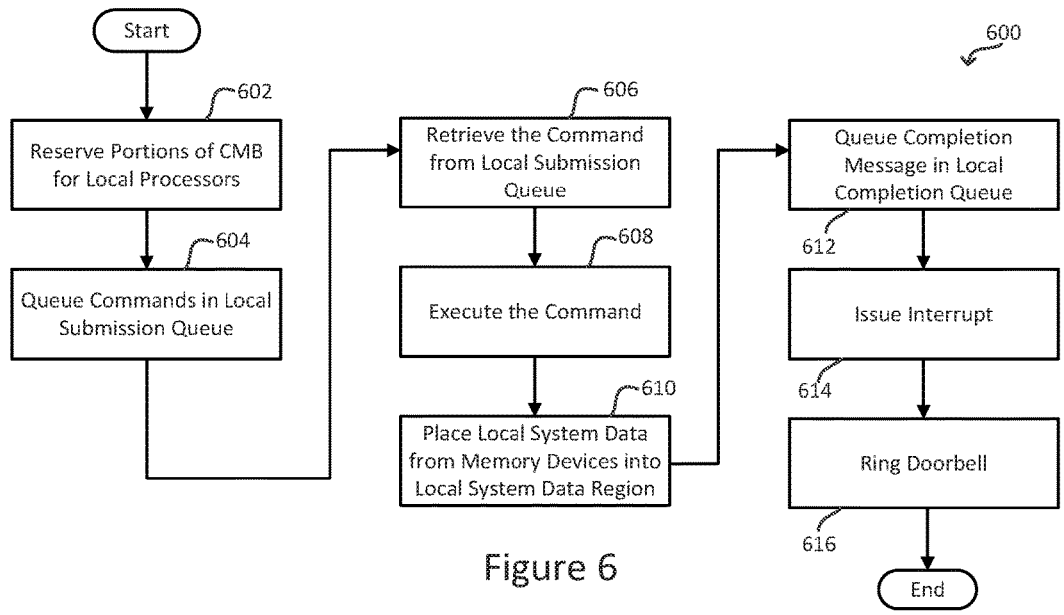
FIG. 6 shows a flowchart of steps for reading local system data stored in one or more memory devices of an SSD, according to another embodiment of the present invention.

FIG. 6 shows a flowchart of steps 600 for reading local system data stored in one or more memory devices of an SSD, according to another embodiment of the present invention. At step 602, portions of a controller memory buffer are reserved for one or more local processors of the SSD's memory controller. As previously discussed in connection with FIGS. 1-4, areas of the controller memory buffer may be reserved as local command submission queues, local command completions queues, and local system data regions. Two separate areas of the controller memory buffer may further be reserved as a host submission queue and a host data region for a host device connected to the SSD.

At step 604, a local processor queues a read command into its respective local command submission queue in the controller memory buffer. The local processor may notify a command layer processor of the memory controller of the queued read command by writing the tail of the submission queue into a doorbell register of the memory controller. The read command may include a pointer to a location within the one or more non-volatile memory devices where the local system data to be read is located. At step 606, the command layer processor retrieves the read command queued in the local command submission queue. At step 608, the command layer processor executes the retrieved command. At step 610, the command layer processor places the desired local system data from one or more non-volatile memory devices of the SSD in the local processor's respective local system data region of the controller memory buffer. At step 612, the command layer processor queues a completion message into the respective local completion queue of the local processor that submitted the read command. At step 614, the command layer processor issues an interrupt to the local processor. At step 616, the local processor rings the doorbell register of the memory controller to acknowledge the receipt of the completion of the command.

As shown and described above in connection with FIGS. 1-6, a host device and one or more local processors within a SSD's memory controller accesses the SSD's one or more non-volatile memory devices in a similar manner. Both a host processor of the host device and the local processors of the memory controller utilize the controller memory buffer to write and read data to and from the one or more non-volatile memory devices. In effect, the local processors of the memory controller act as a host device would when accessing the one or more non-volatile memory devices. In other words, the local processors of the memory controller can be considered as if they were local host devices within the memory controller itself.

Specifically, by reserving portions of the controller memory buffer for both the host device and one or more local processors, and by providing the one or more local processors with their own local command submission queues, local command completion queues, and local system data regions to manage local system data, the local processors are able to access the one or more non-volatile memory devices in a similar manner as the host processor does. This allows the memory controller to implement a uniform set of commands and definitions for accessing the non-volatile memory devices.

For example, as previously discussed, the NVMe interface standard provides a standardized command set for a host device accessing the non-volatile memory devices of an SSD. These commands include read, write, flush, write uncorrectable, write zeros, compare, dataset management, reservation acquire, reservation register, reservation release, reservation report, etc. The same commands may be applied to the one or more local processors for the handling of local system data because they access the non-volatile memory devices in a similar manner as the host device. As such, the complexity of the SSD's firmware can be greatly reduced as there is no need for a separate set of protocols or management operations for local system data as compared to host data.

Further, by unifying the approach used to access host data of the host device and local system data of the SSD, local system data and host data no longer need to be separately stored in the one or more non-volatile memory devices of the SSD. Accordingly, namespaces for local system data and host data no longer need to be separately managed by the memory controller. Consequently, memory device management operations, such as L2P mapping, garbage collection, wear leveling, bad block management, and power loss protection, no longer need to be separately conducted for local system data and for host data, which significantly reduces the overhead for managing the one or more non-volatile memory devices of the SSD. It can also make operations such as garbage collection and wear leveling more efficient as they can be applied across a single non-volatile memory address space rather than being applied individually to separate host and local processor address spaces.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A method of managing data stored in a solid state drive (SSD), the method comprising:
   reserving a first area and a second area of a controller memory buffer within a memory controller;
   generating, by a first local processor, a set of local commands according to a storage protocol standard;
   receiving, by a host interface communicatively coupled to the memory controller, a set of host commands from a host device according to the storage protocol standard;
   storing the set of local commands in the first area; and the set of host commands in the second area; and
   executing, by a second local processor, the set of local commands and the set of host commands according to the a storage protocol standard.

2. The method of claim 1, further comprising:
   generating, by the first local processor, local system data; and
   storing the local system data in the first area.

3. The method of claim 2, further comprising:
   writing, by the second local processor, local system data in the first area to one or more of non-volatile memory devices communicatively coupled to the memory controller when the set of local commands includes a write command.

4. The method of claim 2, further comprising:
   writing, by the second local processor, local system data in one or more of the non-volatile memory devices communicatively coupled to the memory controller to the first area when the set of local commands includes a read command.

5. The method of claim 2, wherein the local system data includes metadata of host data written to one or more non-volatile memory devices communicatively coupled to the memory controller, logical-to-physical look up tables, read or write counts of logical block addresses, or timestamps of logical block address updates.

6. The method of claim 1, further comprising:
   receiving, by the host interface, host data from the host device; and
   storing the host data in the second area.

7. The method of claim 6, further comprising:
   writing, by the second local processor, host data in the second area to one or more non-volatile memory devices communicatively coupled to the memory controller when the set of host commands includes a write command.

8. The method of claim 6, further comprising:
   retrieving, by the second local processor, host data in one or more non-volatile memory devices communicatively coupled to the memory controller when the set of host commands includes a read command.

9. The method of claim 1, further comprising:
   storing, by the second local processor, a completion message in the first area after one of the set of local commands has been executed.

10. The method of claim 1, wherein the first local processor is a flash translation layer (FTL) processor or a flash interface layer (FIL) processor, and the second local processor is a command layer processor.

11. The method of claim 1, wherein the first local processor generates a set of local commands independent from the set of host commands.

12. The method of claim 1, wherein the storage protocol standard is NVMe.

13. A solid state drive (SSD) comprising:
   a memory controller;
   a controller memory buffer within the memory controller;
   a first local processor configured to generate a set of local commands according to a storage protocol standard;
   a host interface communicatively coupled to the memory controller and configured to receive a set of host commands from a host device according to the storage protocol standard;
   a second local processor configured to execute the set of local commands and the set of host commands according to the storage protocol standard,
   wherein the memory controller is configured to store the set of local commands in a first area of the controller memory buffer reserved for the first local processor and to store the set of host commands in a second area of the controller memory buffer reserved for the host device.

14. The SSD of claim 13, wherein the memory controller is further configured to store local system data generated by the first local processor in the first area.

15. The SSD of claim 14, wherein the set of local commands includes a write command, and the second local processor is further configured to write local system data stored in the first area to one or more non-volatile memory devices communicatively coupled to the memory controller.

16. The SSD of claim 14, wherein the set of local commands includes a read command, and the second local processor is further configured to write local system data stored in one or more non-volatile memory devices communicatively coupled to the memory controller to the first area.

17. The SSD of claim 14, wherein the local system data includes metadata of host data written to one or more non-volatile memory devices communicatively coupled to the memory controller, logical-to-physical look up tables, read or write counts of logical block addresses, or timestamps of logical block address updates.

18. The SSD of claim 13, wherein the host interface is further configured to receive host data from the host device, and the memory controller is further configured to store the host data in the second area.

19. The SSD of claim 18, wherein the set of host commands includes a write command, and the second local processor is further configured to write host data stored in the second area to one or more non-volatile memory devices communicatively coupled to the memory controller.

20. The SSD of claim 18, wherein the set of host commands includes a read command, and the second local processor is further configured to retrieve host data stored in one or more non-volatile memory devices communicatively coupled to the memory controller.

21. The SSD of claim 13, wherein the second local processor is configured to store a completion message in the first area after one of the set of local commands has been executed.

22. The SSD of claim 13, wherein the first local processor is a flash translation layer (FTL) processor or a flash interface layer (FIL) processor, and the second local processor is a command layer processor.

23. The SSD of claim 13, wherein the first local processor generates a set of local commands independent from the set of host commands.

24. The SSD of claim 13, wherein the storage protocol standard is NVMe.

* * * * *